US012579586B2

(12) United States Patent
Cho et al.

(10) Patent No.: US 12,579,586 B2
(45) Date of Patent: Mar. 17, 2026

(54) METHOD OF MANAGING PRODUCTIVITY OF FISH IN LAND-BASED AQUAFARM THROUGH DATA PREDICTION FOR EACH GROWTH PERIOD

(71) Applicant: Korea Electronics Technology Institute, Seongnam-si (KR)

(72) Inventors: Sung Yoon Cho, Seoul (KR); Ki Won Kwon, Seongnam-si (KR); Won Gi Jeon, Seongnam-si (KR); Yang Seob Kim, Gunpo-si (KR); Juhyoung Sung, Seoul (KR); Da Eun Jung, Yongin-si (KR); Young Myoung Ko, Pohang-si (KR); Jongwon Kim, Incheon (KR); Eunbi Park, Seoul (KR)

( * ) Notice: Subject to any disclaimer, the term of this patent is extended or adjusted under 35 U.S.C. 154(b) by 140 days.

(21) Appl. No.: 18/495,105

(22) Filed: Oct. 26, 2023

(65) Prior Publication Data

US 2024/0177250 A1      May 30, 2024

(30) Foreign Application Priority Data

| | | |
|---|---|---|
| Nov. 29, 2022 | (KR) | 10-2022-0163510 |
| Jun. 13, 2023 | (KR) | 10-2023-0075809 |
| Jun. 13, 2023 | (KR) | 10-2023-0075810 |

(51) Int. Cl.
| | |
|---|---|
| *G06Q 50/02* | (2024.01) |
| *A01K 61/10* | (2017.01) |
| *G06Q 10/04* | (2023.01) |
| *G06Q 10/0631* | (2023.01) |

(52) U.S. Cl.
CPC ............. *G06Q 50/02* (2013.01); *A01K 61/10* (2017.01); *G06Q 10/04* (2013.01); *G06Q 10/0631* (2013.01)

(58) Field of Classification Search
CPC .... G06Q 50/02; G06Q 10/04; G06Q 10/0631; A01K 61/10
USPC ........................................................ 705/7.12
See application file for complete search history.

(56) References Cited

U.S. PATENT DOCUMENTS

2013/0206078 A1 *   8/2013   Melberg ................. A01K 61/80
119/230

FOREIGN PATENT DOCUMENTS

| | | |
|---|---|---|
| KR | 10-2018-0057785 A | 5/2018 |
| KR | 10-2022-0096172 A | 7/2022 |
| KR | 10-2023-0083419 A | 6/2023 |

OTHER PUBLICATIONS

"Design and Implementation of a Smart Seawater Aquarium System Based on Artificial Intelligence of Things Technology" Published by IEEE (Year: 2022).*

(Continued)

*Primary Examiner* — Zeina Elchanti

(57) ABSTRACT

A computer-implemented method of managing the productivity of fish in a land-based aquafarm through data prediction for each growth period is proposed. The method may include predicting, at a processor, a feed amount input to an aquaculture tank based on aquaculture tank sensing data. The method may also include predicting, at the processor, the growth of fish based on results of the prediction of the input feed amount.

5 Claims, 21 Drawing Sheets

(56)     References Cited

OTHER PUBLICATIONS

Fu et al., "Prediction of the diet nutrients digestibility of dairy cows using Gaussian process regression", Information Processing in Agriculture, vol. 6, 2019, pp. 396-406.
Office Action in Korean Patent Application No. 10-2023-0075809 issued on Mar. 18, 2024.
Office Action in Korean Patent Application No. 10-2023-0075810 issued on Apr. 12, 2024.

* cited by examiner

FIG. 2

S410 — PERFORM PREDICTION ON INPUT FEED AMOUNT

S420 — PREDICT GROWTH OF FISH

S430 — TRANSMIT OPTIMAL GROWTH AND DEVELOPMENT CONDITION

FIG. 7

| DATA | ATTRIBUTE (UNIT) | INTERVAL |
|---|---|---|
| SENSOR DATA | DISSOLVED OXYGEN, DO(MG/L) | ONE-MINUTE |
| | TEMPERATURE (°C) | ONE-MINUTE |
| | pH | ONE-MINUTE |
| | OXIDATION REDUCTION POTENTIAL, ORP (MV) | ONE-MINUTE |
| | CO2 (mg/l) | ONE-MINUTE |
| | OXYGEN (L/m) | ONE-MINUTE |
| | LIGHT (mA) | ONE-MINUTE |
| GROWTH DATA | MASS PER FISH UNIT (g) | TWO-WEEKS |
| | AVERAGE MASS PER TANK (g) | THREE-MONTH |
| | NUMBER OF FISH PER TANK | THREE-MONTH |
| FEEDING DATA | FEED QUANTITY FOR A.M. | ONE-DAY |
| | FEED QUANTITY FOR P.M. | ONE-DAY |
| | WATER QUANTITY FOR A.M. | ONE-DAY |
| | WATER QUANTITY FOR P.M. | ONE-DAY |

: SENSOR FAILURE

: REPLACEMENT

▨ : SENSOR FAILURE

▨ : REPLACEMENT

FIG. 9B
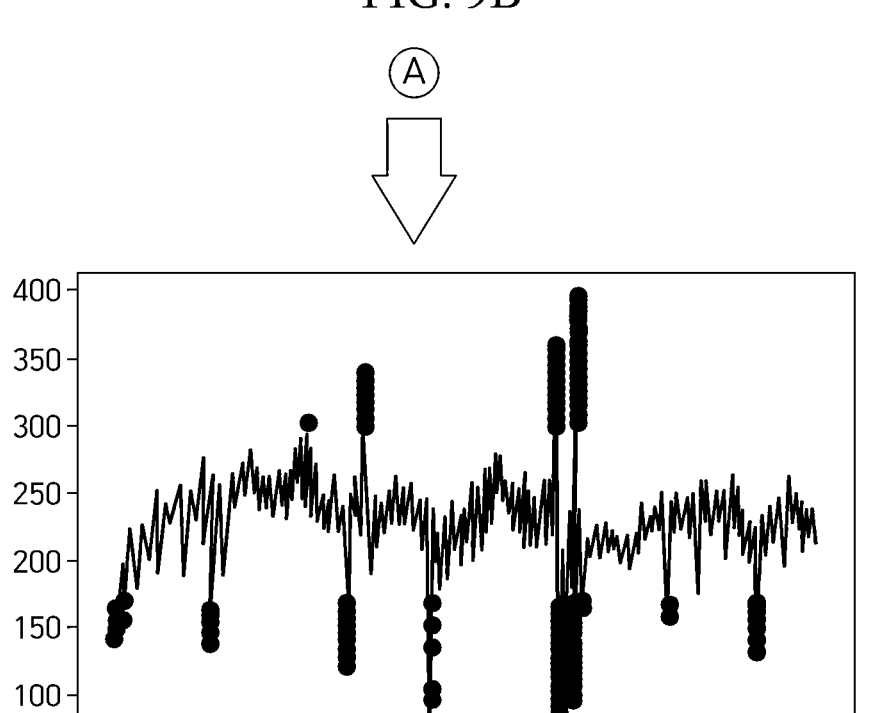
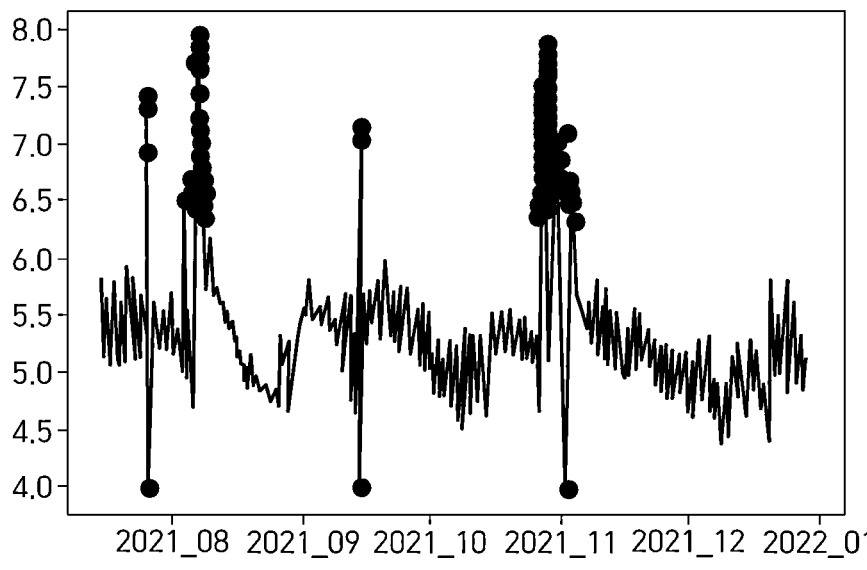

FIG. 11

METHOD OF MANAGING PRODUCTIVITY OF FISH IN LAND-BASED AQUAFARM THROUGH DATA PREDICTION FOR EACH GROWTH PERIOD

CROSS-REFERENCE TO RELATED APPLICATIONS

This application claims priority to and the benefit of Korean Patent Application Nos. 10-2022-0163510, filed on Nov. 29, 2022, 10-2023-0075809, filed on Jun. 13, 2023, 10-2023-0075810, filed on Jun. 13, 2023, the disclosures of each of which is incorporated herein by reference in its entirety.

BACKGROUND

Technical Field

The present disclosure relates to a method of managing the productivity of fish in a land-based aquafarm through data prediction for each growth period.

Description of Related Technology

Generally, most of land-based aquafarms have limits in that aquafarm automation is difficult and a problem in that it is difficult to inherit a farming technology because they are operated based on human's experiential data.

SUMMARY

One aspect is a method of managing the productivity of fish in a land-based aquafarm through data prediction for each growth period, which can improve the productivity of an aquafarm and improve operation efficiency of the aquafarm by using an input feed amount prediction model and a divided fish growth prediction model that have been trained.

Another aspect is a method of managing the productivity of fish in a land-based aquafarm through data prediction for each growth period that includes steps of (a) performing prediction on a feed amount input to an aquaculture tank based on aquaculture tank sensing data and (b) performing prediction on the growth of fish based on results of the prediction of the input feed amount.

The step (a) includes performing the prediction on the input feed amount based on results of the calculation of a functional formula using a fish weight, the amount of oxygen, and a water temperature.

The step (a) includes performing the prediction on the input feed amount by using a look-up table for the amount of oxygen consumed and a feed amount supplied.

The step (b) includes performing the prediction on the growth of the fish by operating fish growth prediction models, which are divided in a weight unit, in parallel.

The step (b) includes performing prediction on timing at which fish is selected based on results of the prediction of a weight value and a weight variance value.

Another aspect is an apparatus for managing the productivity of fish in a land-based aquafarm that includes an input unit configured to receive input information including aquaculture tank information and environment information, memory in which a program that performs prediction on an input feed amount based on the input information has been stored, and a processor configured to execute the program. The processor divides a model for predicting the growth of fish by considering results of the prediction of the input feed amount for each timing at which fish is selected and outputs results of the prediction of the growth of the fish and the timing at which fish is selected.

An embodiment of the present disclosure proposes a model for automatically predicting an input feed amount for the fish growth prediction model, and can reduce a human error attributable to a manual input for the input feed amount by using sensor data of a land-based aquafarm. Furthermore, there is proposed the fish growth prediction model that operates adaptively to a fish selection task that periodically occurs in a land-based aquafarm through a learning model by predicting a growth gap occurring when fish is selected.

An embodiment of the present disclosure proposes the fish growth prediction model having higher accuracy through prediction for each selected aquaculture tank and for each period by applying a fish model at next timing when fish is selected, not the prediction of fish weight for the entire cycle within an aquaculture tank.

According to an embodiment of the present disclosure, it is possible to improve the accuracy of the fish growth prediction model, and there are positive effects on the operation of a land-based aquafarm by increasing fish nurturing efficiency.

According to an embodiment of the present disclosure, there is an effect in that detailed data for an aquafarm are collected and help various researches of fish to be performed in the future.

Effects of the present disclosure which may be obtained in the present disclosure are not limited to the aforementioned effects, and other effects not described above may be evidently understood by a person having ordinary knowledge in the art to which the present disclosure pertains from the following description.

BRIEF DESCRIPTION OF THE DRAWINGS

FIG. 2 illustrates a feed amount and a structure of a fish growth prediction model according to an embodiment of the present disclosure.

FIG. 7 illustrates a land-based aquafarm collection data classification system according to an embodiment of the present disclosure.

FIGS. 9A and 9B illustrate the application of an outlier removal method according to an embodiment of the present disclosure.

FIG. 11 illustrates the generation of data sets according to an embodiment of the present disclosure.

DETAILED DESCRIPTION

Figure 1:
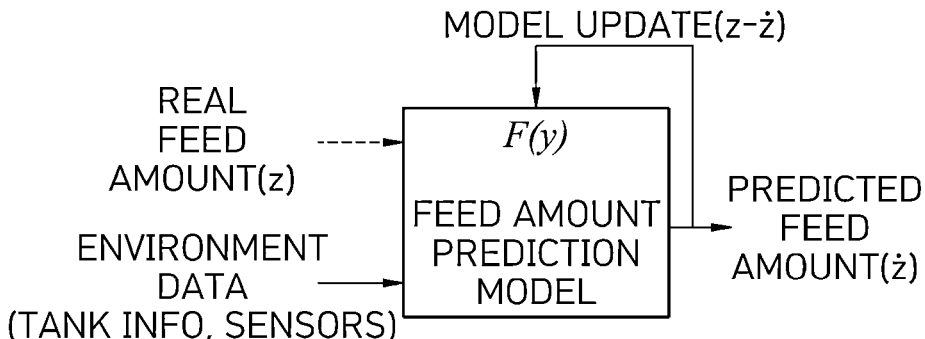
FIG. 1 illustrates a structure of a feed amount prediction model according to an embodiment of the present disclosure.

It may be necessary to model the growth of fish and to generate a model for predicting the growth of fish. It is possible to maximize operation efficiency of an aquafarm and to expand a land-based fish farming market by solving the heritage problem of a fish farming technology through a fish growth prediction model. For the smooth growth of a fish growth prediction model, accurate data for the growth of aquafarms need to be collected. According to a method of inputting feed by using an automatic feed supplier, the input feed amount can be accurately known and human resources can be reduced, but it is difficult to install corresponding equipment in common aquafarms because an installation cost for the method is high. Furthermore, upon farming, there are many cases in which feed, such as paste feed having a form in which it is difficult to input the paste feed through a machine, is input. Accordingly, a method of a person directly measuring an accurate amount of feed input may be used. In actual aquafarms, in relation to data that are manually input such as a feed amount, there is a case in which data is omitted due to a human error. There is a problem in that the accuracy of a fish farming model is low due to an error or gap of manual input data.)

Furthermore, in land-based aquafarms, upon fish growth and development, a task for inputting fish having similar sizes/weight to one tank through a periodical selection task based on the size of fish is performed. In such a process, it is difficult to collect data for the growth of fish, and there are limits in predicting the growth of fish during the entire period through a growth model.

The aforementioned object, other objects, advantages, and characteristics of the present disclosure and a method for achieving the objects, advantages, and characteristics will become clear with reference to embodiments to be described in detail along with the accompanying drawings.

However, the present disclosure is not limited to embodiments disclosed hereinafter, but may be implemented in various different forms. The following embodiments are merely provided to easily notify a person having ordinary knowledge in the art to which the present disclosure pertains of the objects, constructions, and effects of the present disclosure. The scope of rights of the present disclosure is defined by the writing of the claims.

Terms used in this specification are used to describe embodiments and are not intended to limit the present disclosure. In this specification, an expression of the singular number includes an expression of the plural number unless clearly defined otherwise in the context. The term "comprises" and/or "comprising" used in this specification does not exclude the presence or addition of one or more other components, steps, operations and/or components in addition to mentioned components, steps, operations and/or components.

According to an embodiment of the present disclosure, stable modeling is performed by securing the stability of data of an input feed amount, in a way to automatically predict feed input data based on data of a sensor installed in an aquaculture tank and to propose automated fish growth prediction modeling by periodically correcting the predicted feed input data.

An embodiment of the present disclosure proposes a fish growth prediction model that has been divided for each time in order to handle a data loss occurring due to a selection task by being applied to an aquafarm at a site in which the selection task for periodically putting entities having the same size into the aquaculture tank is performed. According to an embodiment of the present disclosure, a distribution of fish weights within an aquaculture tank according to the growth of fish is predicted, and selection timing is proposed based on the predicted distribution.

According to an embodiment of the present disclosure, the fish growth prediction model is constructed by installing a sensor at a land-based aquaculture tank, predicting the development of changes in data generated when fish eats food, and predicting a feed amount. According to an embodiment of the present disclosure, it is possible to construct the fish growth prediction model having improved accuracy in a form in which the fish growth prediction model has been divided according to the growth of fish by analyzing a selection task in an actual aquafarm.

FIG. 1 illustrates a structure of a feed amount prediction model according to an embodiment of the present disclosure.

A feed amount prediction model predicts an input feed amount based on data, such as data of an environment in which an aquaculture tank has been installed, the width and height of the aquaculture tank, the amount of water input, which is sensed by a flow sensor, and the amount of living fish within the aquaculture tank.

For feed amount prediction modeling, it is required to previously perform mathematical modeling based on measurement data. The amount of living fish that has been actually input, dissolved oxygen, a water temperature, and a feed amount are used as input values. A functional formula, such as Equation 1 (see below (1)), is calculated by measuring the amount of dissolved oxygen that is consumed by fish.

$$\text{The amount of oxygen consumed}=f(\text{fish weight,the initial amount of oxygen,a water temperature,a feed amount supplied}) \tag{1}$$

Modeling for estimating a feed amount supplied as in Equation 2 (see below (2)) is possible through an operation having an inverse function form of Equation 1.

$$\text{The feed amount supplied}=g(\text{fish weight,the initial amount of oxygen,a water temperature,the amount of oxygen consumed}) \tag{2}$$

According to the aforementioned example, it is possible to estimate the feed amount supplied in a mathematical function form. As another example, the feed amount supplied may be constructed in a look-up table (LUT) form between the feed amount supplied and the amount of oxygen consumed.

According to an embodiment of the present disclosure, an error between a predicted value and an actual value, which occurs over time, is reduced in a way that the fish growth prediction model is autonomously updated by comparing a feed amount that has been actually input and a predicted feed amount for each predetermined cycle. Accordingly, although a user does not directly write a feed amount, an input feed amount can be predicted based on the development of changes in sensing data, such as the amount of water input and a reduction of oxygen saturation.

The predicted feed amount is stored in a storage device, such as a management server, in order to secure data for fish production and management. A feed amount that has been supplied in an actual operation and a feed amount that has been predicted by the feed amount prediction model may be used to determine an operation and management of an aquafarm by simultaneously managing the supplied feed amount and the predicted feed amount. Furthermore, the predicted feed amount is input to the fish growth prediction model as an input, and is used to predict a future growth rate of fish.

According to an embodiment of the present disclosure, the fish growth prediction model is constructed to have a structure in which the fish growth prediction model has been divided for each time, in order to solve problems, such as a data loss attributable to a selection task in an aquafarm site and a reduction of the accuracy of the fish growth prediction model due to the periodical resetting of aquaculture tank information. According to an embodiment of the present disclosure, the growth of fish is divided and learnt for each period and then integrated. Accordingly, a degree of the growth of fish is predicted by applying a proper model based on a current degree of the growth of fish, the accuracy of the prediction of a general degree of the growth of fish is improved, and an error that occurs according to the cyclic selection of fish is supplemented.

Figure 2:
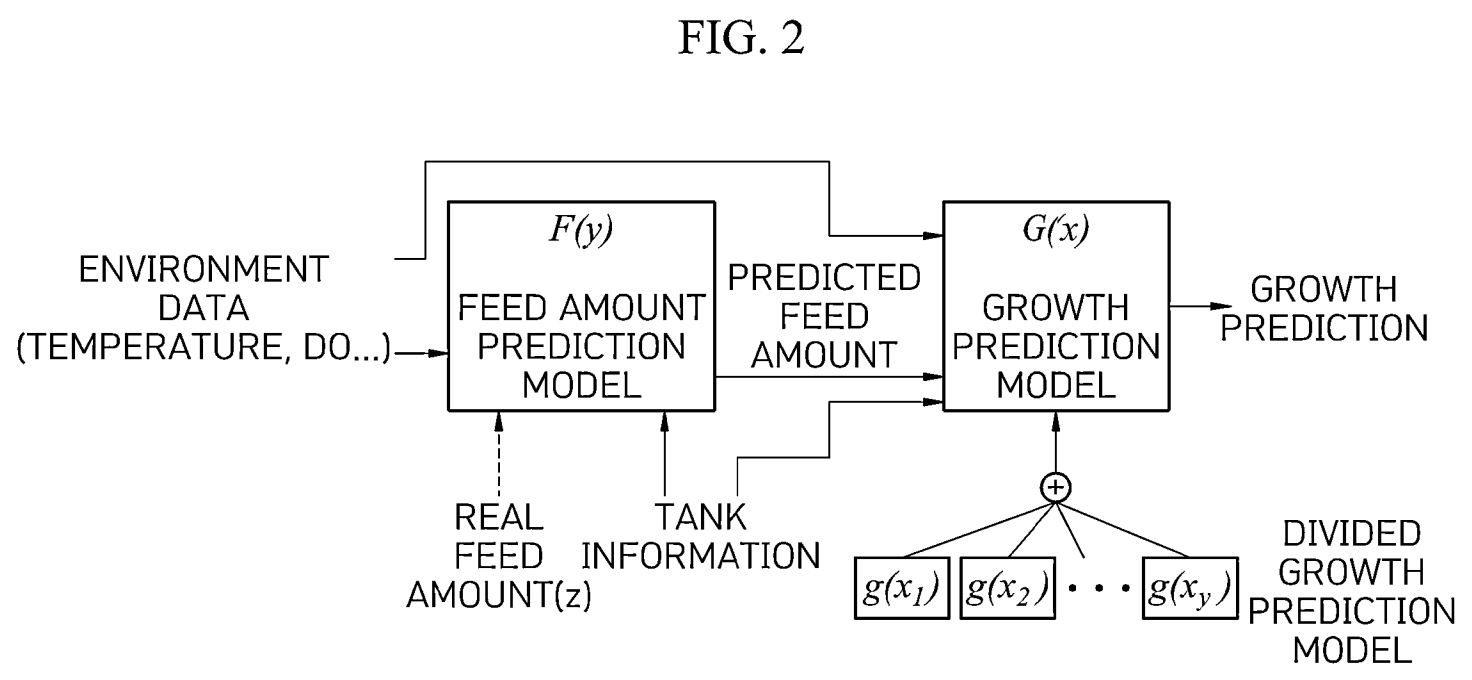

FIG. 2 illustrates a feed amount and a structure of the fish growth prediction model according to an embodiment of the present disclosure.

Information, such as environment data and the amount of living fish within an aquaculture tank (i.e., tank information), is input to the feed amount prediction model and the fish growth prediction model. A predicted feed amount is input to the fish growth prediction model, so that the growth of fish is finally predicted (growth prediction).

The fish growth prediction model for each period (i.e., a divided growth prediction model) may be implemented by a time-series deep learning engine, such as LSTM. The fish growth prediction models operate in parallel in a weight unit. In the fish growth prediction model, input data includes standing weight, environment data such as a water temperature and DO, and operation data such as a feed amount. Output data includes an average growth weight and a deviation value after a specific time period. A predicted average growth weight and deviation are used for the production and management of fish in order to classify species of fish and adjust the amount of shipments at specific timing.

The fish growth prediction model outputs a predicted weight value and a weight variance value according to the predicted weight value. Timing at which fish is selected can be predicted because the weight variance value is used as a parameter for the size and weight of fish, which occurs because a degree of the growth of fish is different although the same feed amount is input.

Figure 3:
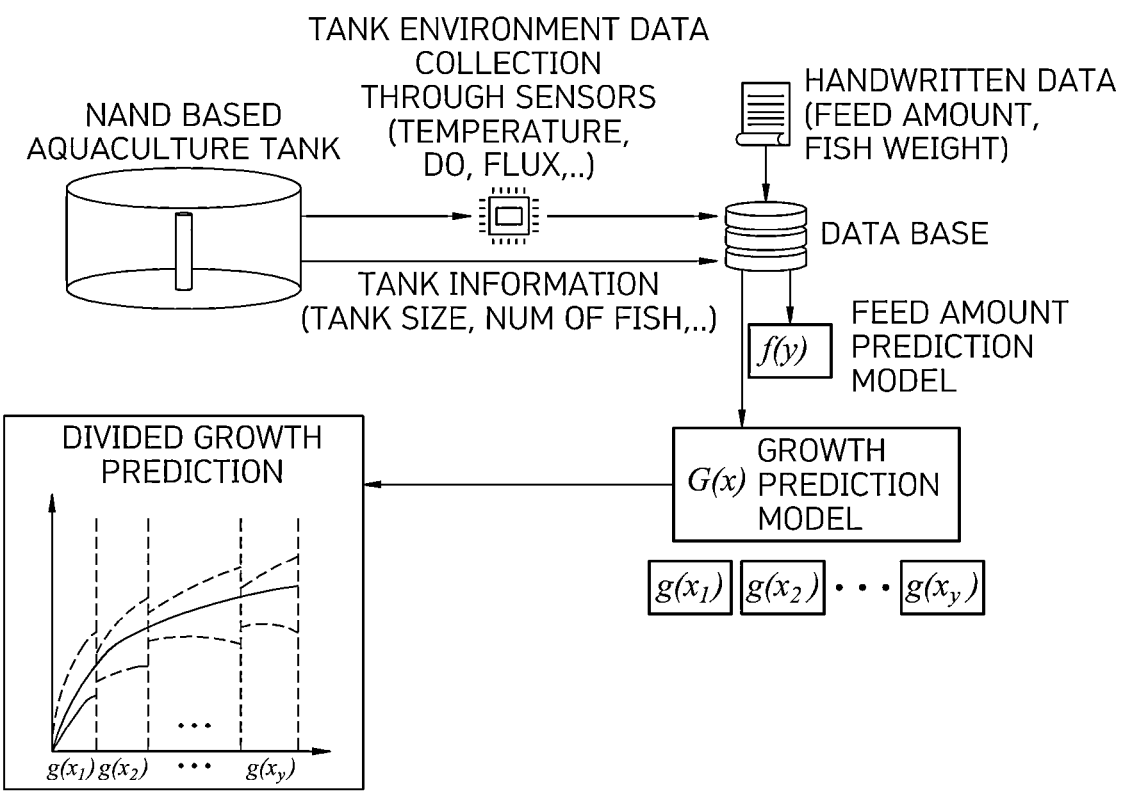
FIG. 3 illustrates a general flow for the management of fish productivity according to an embodiment of the present disclosure.

FIG. 3 illustrates a general flow for the management of fish productivity according to an embodiment of the present disclosure.

Data of an environment of an aquafarm, such as data of an environment in an aquaculture tank and information of fish within the aquaculture tank, are input. Periodically hand-written data are input to a database. The hand-written data include a feed amount and a measured fish weight.

The data accumulated in the database are input to the feed amount prediction model. The feed amount prediction model predicts an input feed amount and a feed amount to be input in the future. The fish growth prediction model outputs data relating to timing at which fish is selected and a degree of growth of fish.

Figure 4:
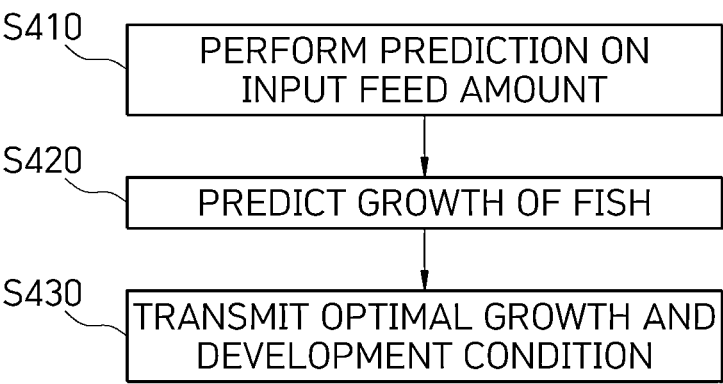
FIG. 4 illustrates a method of managing the productivity of fish in a land-based aquafarm through data prediction for each growth period.

FIG. 4 illustrates a method of managing the productivity of fish in a land-based aquafarm through data prediction for each growth period according to an embodiment of the present disclosure.

The method of managing the productivity of fish in a land-based aquafarm through data prediction for each growth period according to an embodiment of the present disclosure includes step S410 of performing prediction on an input feed amount and step S420 of performing prediction on the growth of fish based on the results of the prediction of the input feed amount.

In step S410, the feed amount prediction model performs the prediction on the input feed amount based on a fish weight, the initial amount of oxygen, a water temperature, and the amount of oxygen consumed.

As another example, in step S410, the feed amount prediction model may perform the prediction on the input feed amount by using a look-up table for the amount of oxygen consumed and a feed amount supplied.

In step S410, the feed amount prediction model may be updated by comparing the results of the prediction of the input feed amount and a feed amount that has been actually input.

In step S420, the fish growth prediction models that are divided in a weight unit are operated in parallel, and perform the prediction on the growth of fish.

In step S420, the fish growth prediction model performs prediction on timing at which fish is selected based on a predicted weight value and a weight variance value.

The method of managing the productivity of fish in a land-based aquafarm through data prediction for each growth period according to an embodiment of the present disclosure further includes step S430 of transmitting an optimal growth and development condition based on the results of the prediction of the fish growth.

In step S430, a control element for the environment data within the aquaculture tank is calculated, and a control command according to the control element is transmitted. For example, it is possible to transmit a control command for adjusting a feed amount supplied, adjusting the amount of dissolved oxygen, or adjusting a water temperature so that an environment condition for each growth and development step is satisfied. An optimal growth and development condition may be differently set depending on several production conditions. For example, an optimal growth and development condition is set for each time by comprehensively considering shipment timing, the amount of shipment predicted, predicted price fluctuation information for each time, price change information, and predicted price change information, and a control command according to the set optimal growth and development condition is transmitted.

Figure 5:
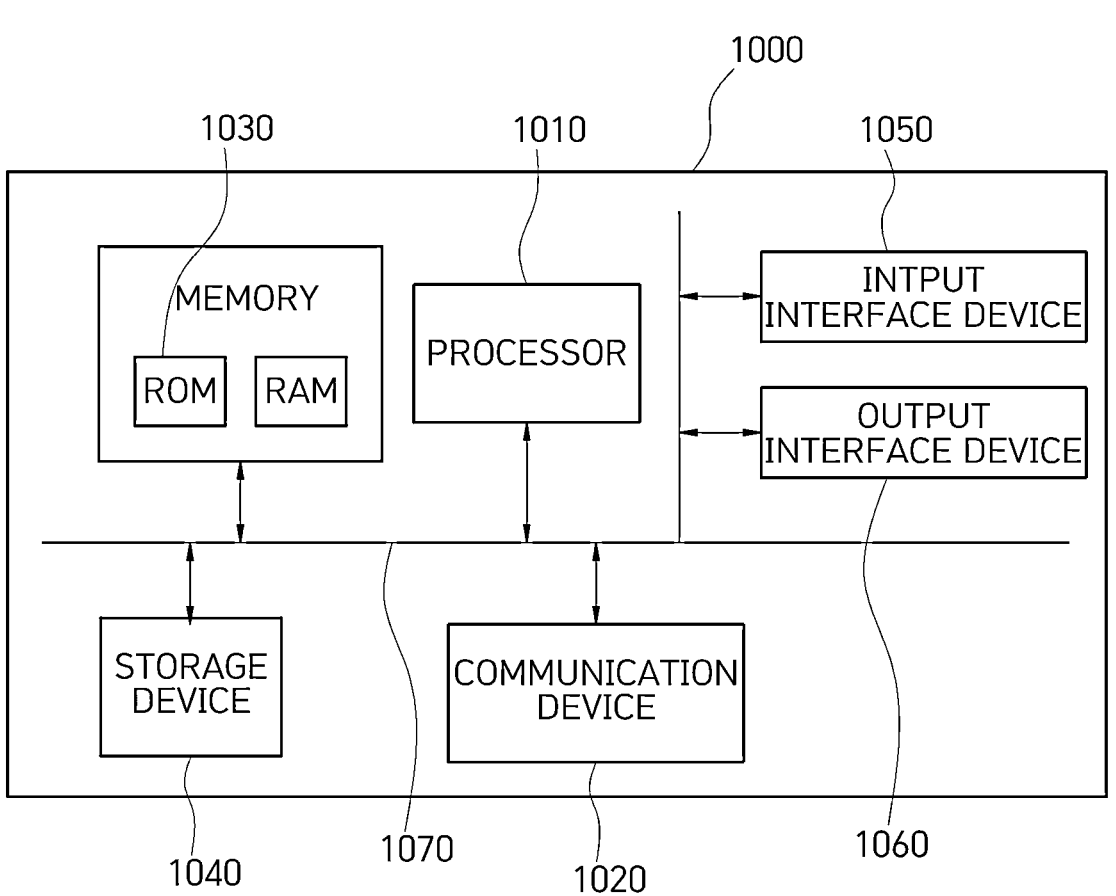
FIG. 5 is a block diagram illustrating a computer system for implementing a method according to an embodiment of the present disclosure.

FIG. 5 is a block diagram illustrating a computer system for implementing a method according to an embodiment of the present disclosure.

Referring to FIG. 5, the computer system 1000 may include at least one of a processor 1010, memory 1030, an input interface device 1050, an output interface device 1060, and a storage device 1040 which communicate with each other through a bus 1070. The computer system 1000 may further include a communication device 1020 connected to a network. The processor 1010 may be a central processing unit (CPU) or may be a semiconductor device that executes instructions stored in the memory 1030 or the storage device 1040. The memory 1030 and the storage device 1040 may include various types of volatile or nonvolatile storage media. For example, the memory may include read only memory (ROM) and random access memory (RAM). In an embodiment of the present specification, the memory may be disposed inside or outside the processor, and may be connected to the processor through various known means. The memory includes various types of volatile or nonvolatile storage media, and may include read-only memory (ROM) or random access memory (RAM), for example.

Accordingly, an embodiment of the present disclosure may be implemented as a method implemented in a computer or may be implemented as a non-transitory computer-readable medium in which a computer-executable instruction has been stored. In an embodiment, when being executed by a processor, a computer-readable instruction may perform a method according to at least one aspect of this writing.

The communication device 1020 may transmit or receive a wired signal or a wireless signal.

Furthermore, the method according to an embodiment of the present disclosure may be implemented in the form of a program instruction which may be executed through various computer means, and may be recorded on a computer-readable medium.

The computer-readable medium may include a program instruction, a data file, and a data structure alone or in combination. A program instruction recorded on the computer-readable medium may be specially designed and constructed for an embodiment of the present disclosure or may be known and available to those skilled in the computer software field. The computer-readable medium may include a hardware device configured to store and execute the program instruction. For example, the computer-readable medium may include magnetic media such as a hard disk, a floppy disk, and a magnetic tape, optical media such as CD-ROM and a DVD, magneto-optical media such as a floptical disk, ROM, RAM, and flash memory. The program instruction may include not only a machine code produced by a compiler, but a high-level language code capable of being executed by a computer through an interpreter.

The embodiments of the present disclosure have been described in detail, but the scope of rights of the present disclosure is not limited thereto. A variety of modifications and changes using the basic concept of the present disclosure defined in the appended claims are also included in the scope of rights of the present disclosure.

Another embodiment of the present disclosure proposes a data collection and pre-processing method for land-based aquafarm fish growth prediction and analysis.

According to a conventional technology, most of land-based aquafarms have problems in the difficulty of the heritage of fish farming technologies and aquafarm automation because they are operated based on human's experiential data. In order to solve the aforementioned problems, it is necessary to model the growth of fish and to generate a model capable of predicting growth prediction. It is possible to maximize operation efficiency of an aquafarm and to expand a land-based fish farming market by solving the heritage problem of a fish farming technology through the fish growth prediction model.

In predicting and analyzing the growth of fish, in order to improve the accuracy of the prediction and analysis, not simple data collection, but a data processing technology suitable for actual modeling needs to be introduced. However, data that are collected in actual aquafarms have problems in that a measurement cycle is different and an error rate in a collection process is great because the data are chiefly handwritten.

Furthermore, in land-based aquafarms, when fish is grown, a task for inputting fish having similar sizes and weight to the same tank through a periodical selection task based on the size of fish is performed. There is a need for a data pre-processing technology which may be used for modeling development because it is difficult to consecutively collect data for the growth of fish in such a process.

The present disclosure has been proposed based on the aforementioned background, and has an object of proposing a data processing scheme (data classification and pre-processing) according to each data characteristic with respect to various data which may be collected in a land-based aquafarm and providing a method of generating a data set which can be easily used for fish growth prediction and analysis based on the data processing scheme.

A data collection and pre-processing method for the prediction and analysis of the growth of fish in a land-based aquafarm according to an embodiment of the present disclosure includes (a) a step of classifying sensor data, growth and development data, and growth data, that is, data obtained from a land-based aquafarm and (b) a step of performing filtering on the data obtained from the land-based aquafarm, performing synchronization on cycles for each data characteristic, and generating a data set for fish growth prediction and analysis.

In the step (a), the sensor data, the growth and development data including a feed amount and the amount of water supplied, and the growth data including weight and the number of fishes, which are periodically collected through an electronic device, are classified.

In the step (b), the filtering is performed on the data by checking whether an error is included in the data. In this case, the filtering is performed by deleting data prior to a date when a sensor is replaced when the sensor is replaced, deleting data prior to a date when a cause of abnormal data occurs when the abnormal data is collected, and removing outlier data of the sensor.

In the step (b), a maximum value and a minimum value, among measured sensor values, are set. Data greater than a boundary value having a predetermined ratio or more is processed as an outlier.

In the step (b), the synchronization is performed on cycles by designating a representative value through an average and variance degree operation for data having a first cycle unit and aligning the data having the first cycle unit as input data having a second cycle unit.

In the step (b), the data set is generated by mapping the sensor data having a preset unit and items for growth and development data as an input value and mapping measured weight values as an output value.

In the step (b), a data capacity is reduced and converted by applying a data reduction scheme.

According to an embodiment of the present disclosure, data are classified by incorporating an aperiodic data characteristic. Accordingly, it is possible to increase intuition in a data utilization aspect, support the easy interpretation of data collected from a land-based aquafarm, and easily apply to artificial intelligence-based growth prediction modeling, compared to a conventional technology in which only the lump-collection of data is simply performed.

An embodiment of the present disclosure has an effect in that an outlier can be automatically removed by filtering the outlier by incorporating the occurrence of an error of collection data.

An embodiment of the present disclosure has an effect in that it can reduce a feeling of burden on processing by converting the data into statistics if a collection cycle of the data is too frequent in specific data item.

An embodiment of the present disclosure has an effect in that it solves a data discontinuity problem by integrating and operating related data in a minimum data set unit according to a growth period for the analysis of a degree of growth, providing a dimension reduction scheme within the data set, and generating a data set for analysis by considering a selection task period occurring in a site.

Figure 6:
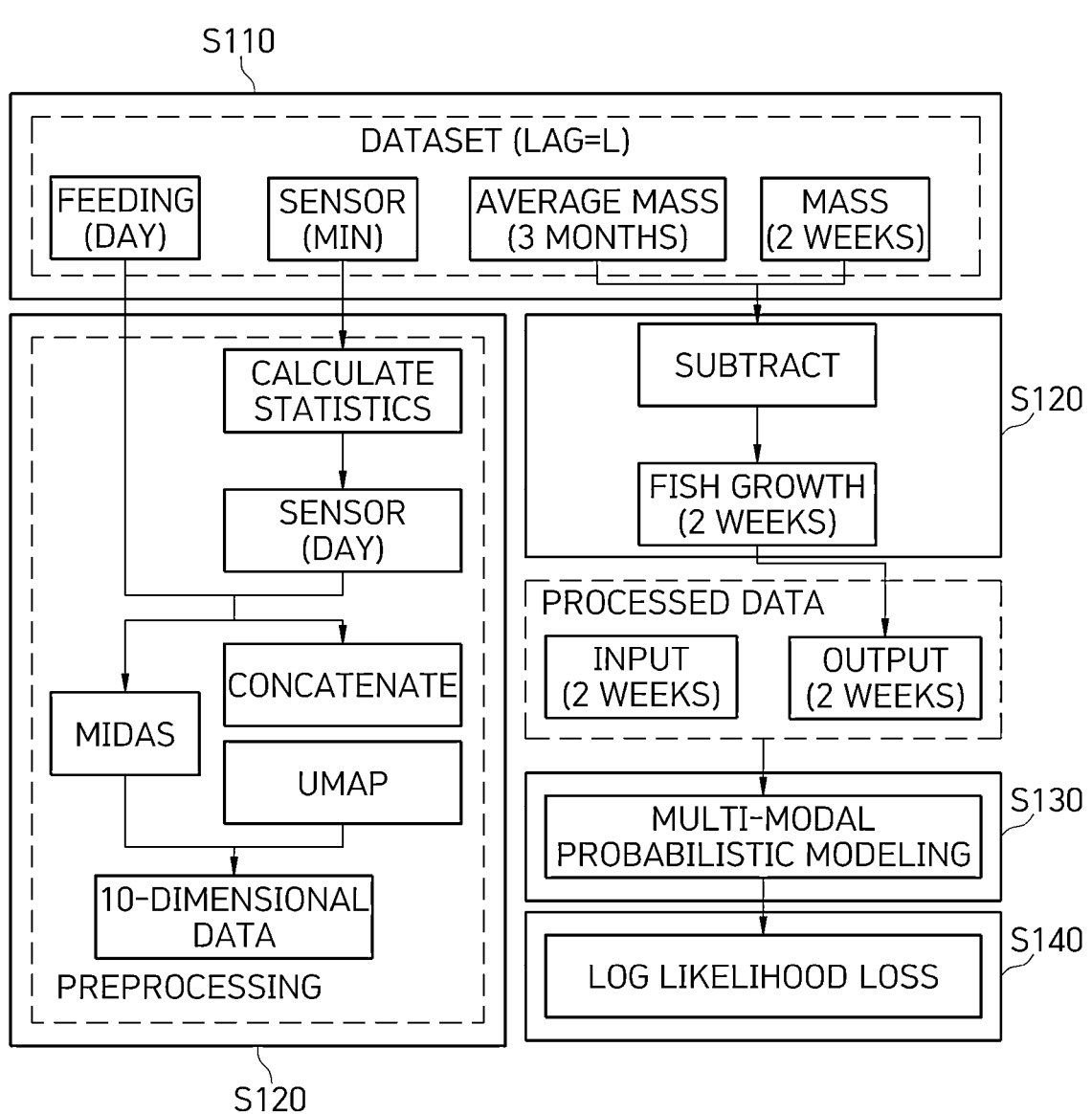
FIG. 6 illustrates an algorithm diagram for a pre-processing process for land-based aquafarm data according to an embodiment of the present disclosure.
Figure 8A:
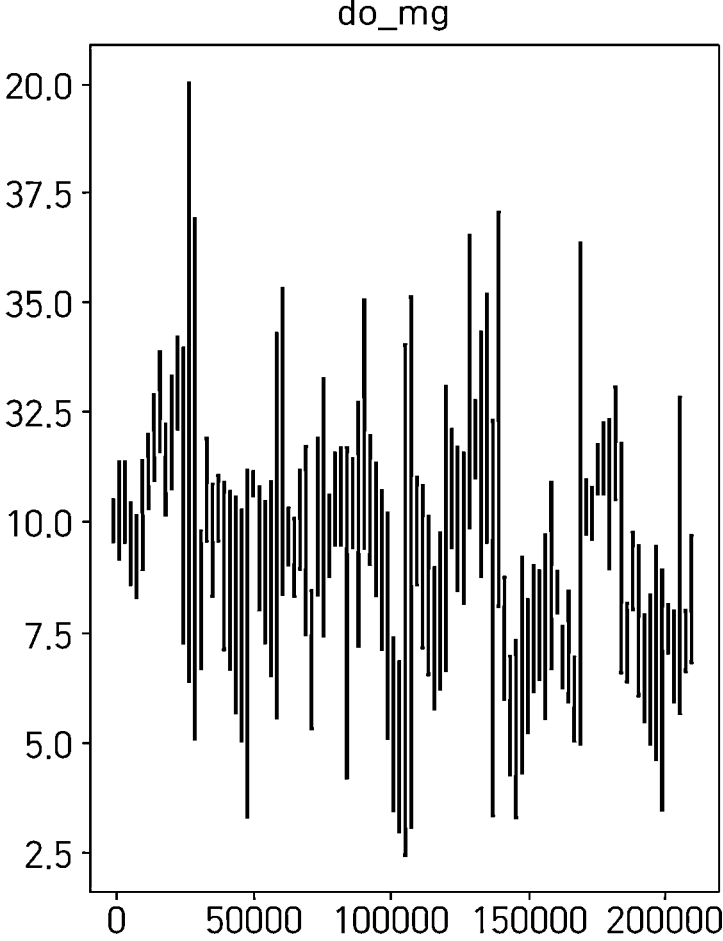
FIGS. 8A through 8G illustrate a loss of sensor data that are generated in a measurement period.
Figure 8B:
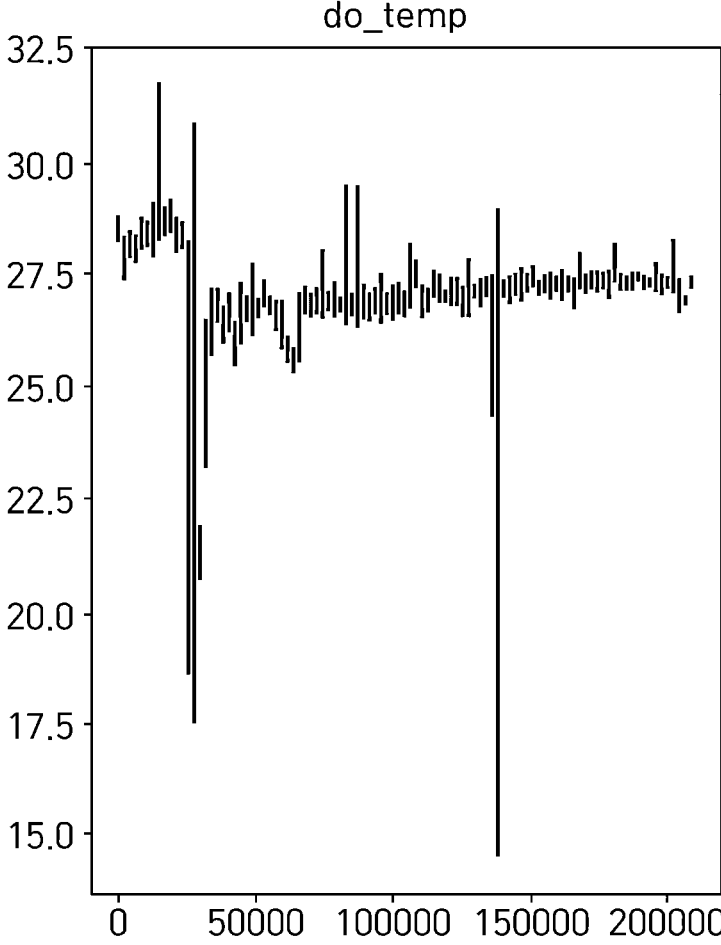
Figure 8C:
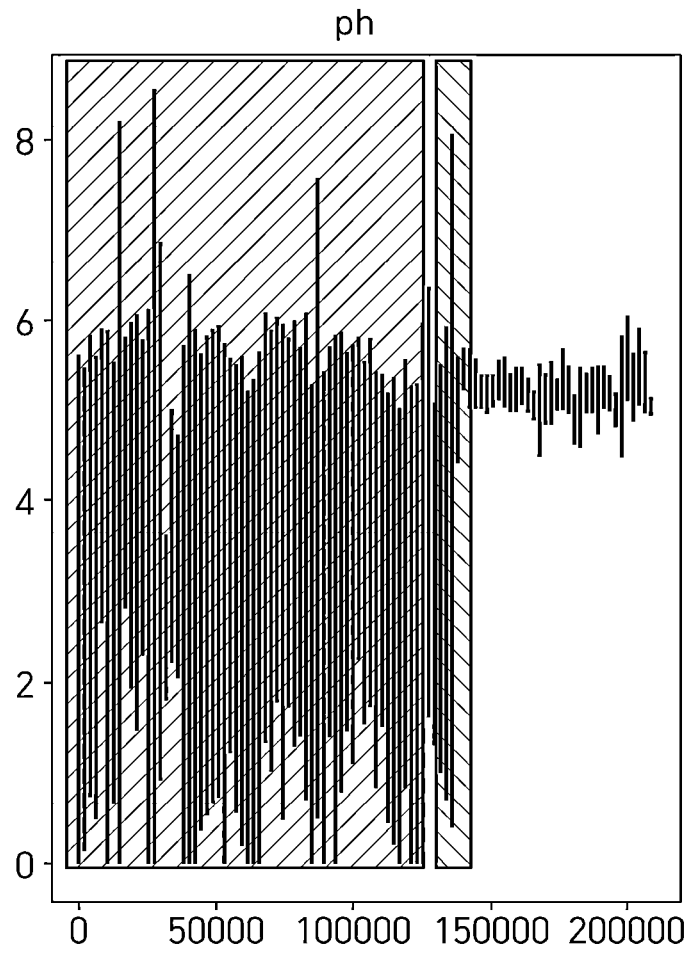
Figure 8D:
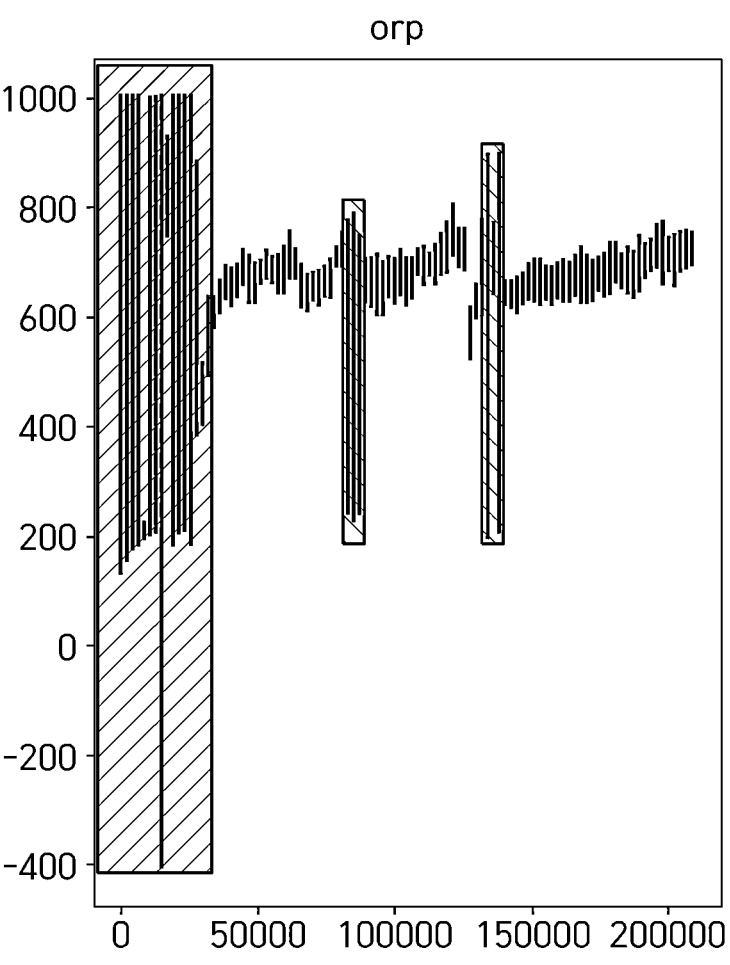
Figure 8E:
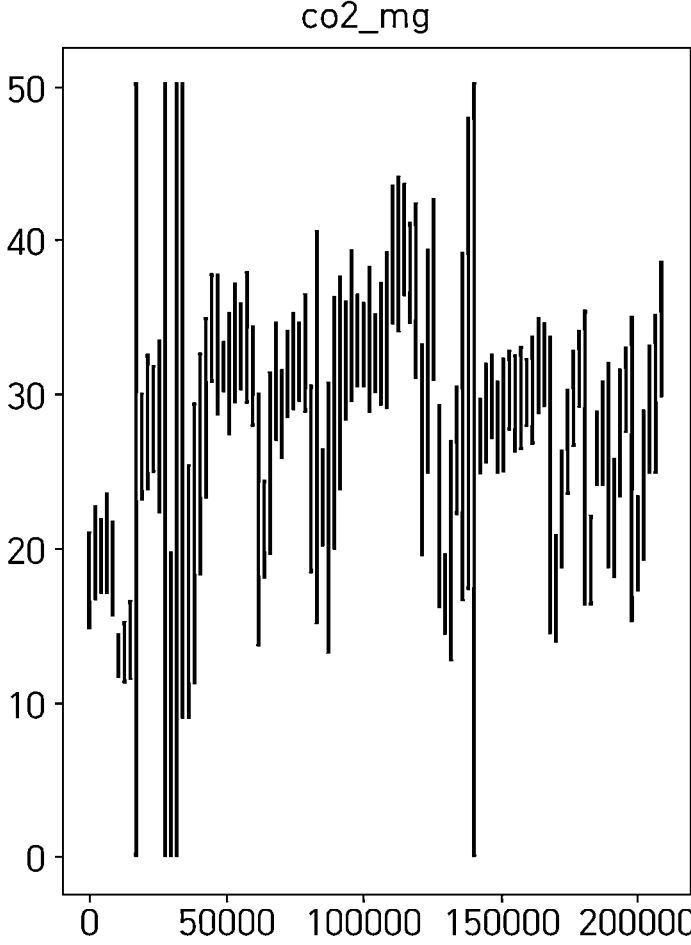
Figure 8F:
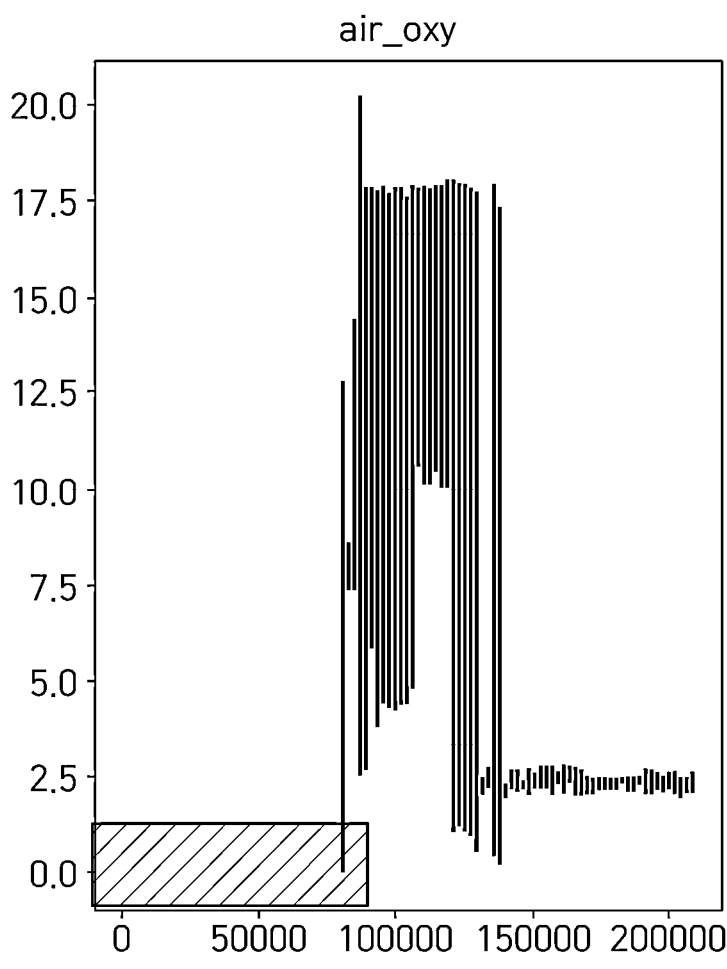
Figure 8G:
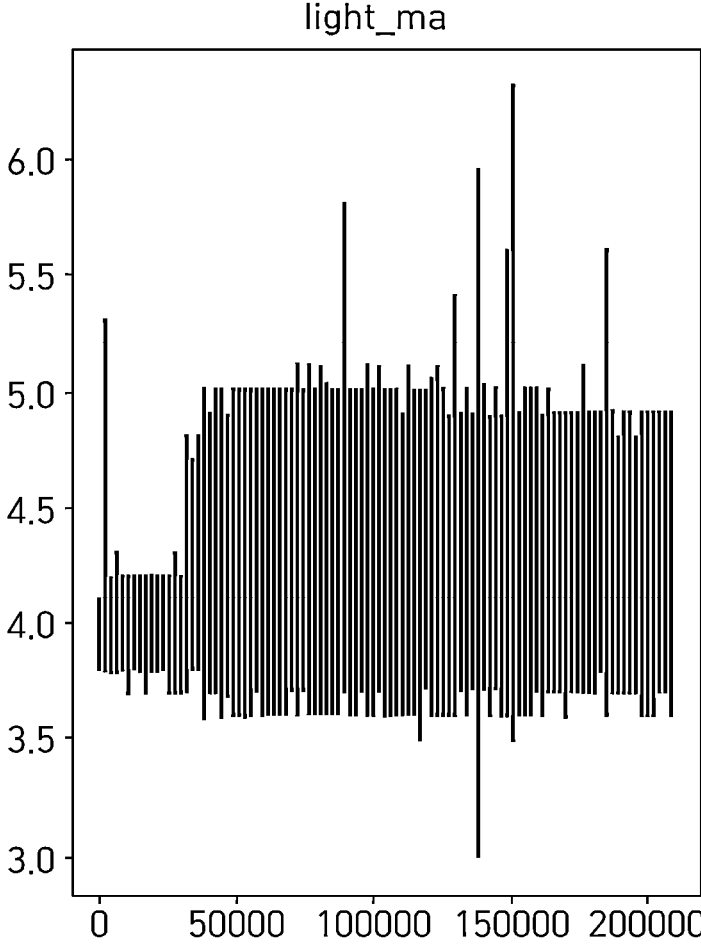

Referring to FIG. 6, in step S110, data obtained from a land-based aquafarm are classified. In step S120, pre-processing is performed on the data. In step S130, probabilistic modeling is performed. In step S140, performance evaluation is performed.

In step S110 (data classification step), the data obtained from the land-based aquafarm are classified into sensor data that are periodically collected within a short time (e.g., a minute or second unit) through an electronic device, growth and development data (e.g., a feed amount and the amount of water supplied) capable of being measured in a day unit, and growth data (e.g., a two-week or three-month unit, and a total weight and the number of fishes within a tank) related to a degree of growth that is measured in a week/month unit (i.e., the sensor data, the growth and development data, and the growth data have different collection cycles). With respect to a data classification item, the sensor data and the growth and development data are selected as input values for growth prediction and analysis modeling. In relation to output values according to the input values, weight for each single fish or a total weight value for each aquaculture tank is selected as grow data.

In the data filtering step of the pre-processing process in step S120, filtering is performed on the sensor data by considering meaningless data that are collected for each specific period in a frequent replacement and selection process attributable to the occurrence of a failure in an underwater sensor. FIG. 3 illustrates a loss of sensor data occurring in a measurement period. An area indicated by a pink color illustrates a case in which abnormal data are collected due to a failure or the replacement of a sensor.

Figure 9A:
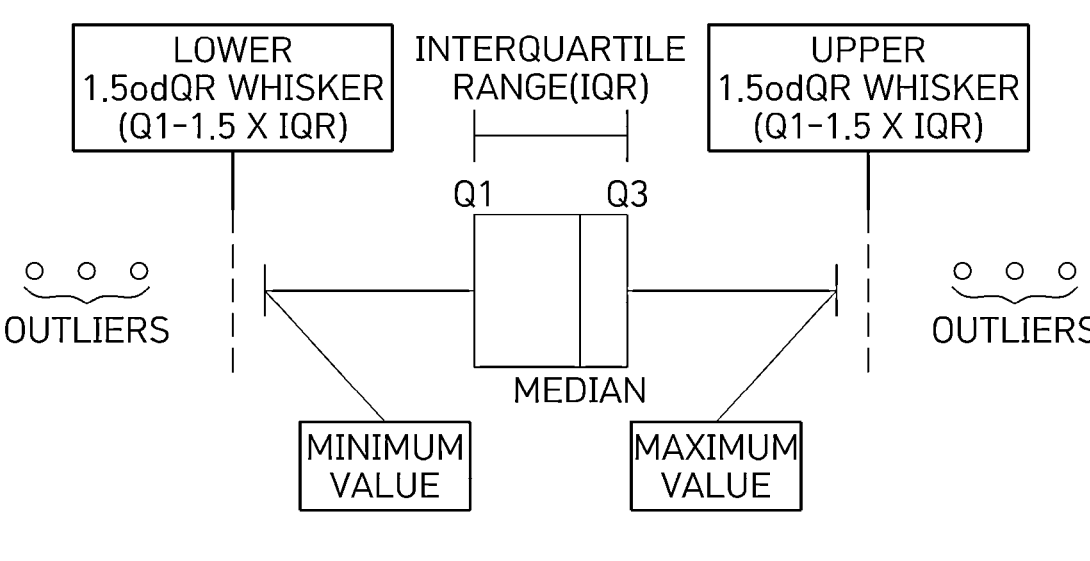

According to another embodiment of the present disclosure, a data set a data error of which has been checked is excluded from all data sets. For example, if a sensor of a specific aquaculture tank is replaced, data prior to a corresponding replacement date are deleted. If abnormal pH data are collected due to the occurrence of a short-circuit current in a specific aquaculture tank, data prior to a date when the corresponding short-circuit current is generated are deleted. Outlier data of the sensor are removed. FIGS. 9A and 9B illustrate the application of an outlier removal method according to an embodiment of the present disclosure. According to another embodiment of the present disclosure, a maximum value and minimum value Q3 and Q1 of measured sensor values are set. Data greater than a boundary value having a specific ratio or more on the basis of a period are processed as an outlier. That is, when a value of data is greater than Q3+a (Q3−Q1) or smaller than Q1−a (Q3−Q1), the data is processed as an outlier.

Figure 10:
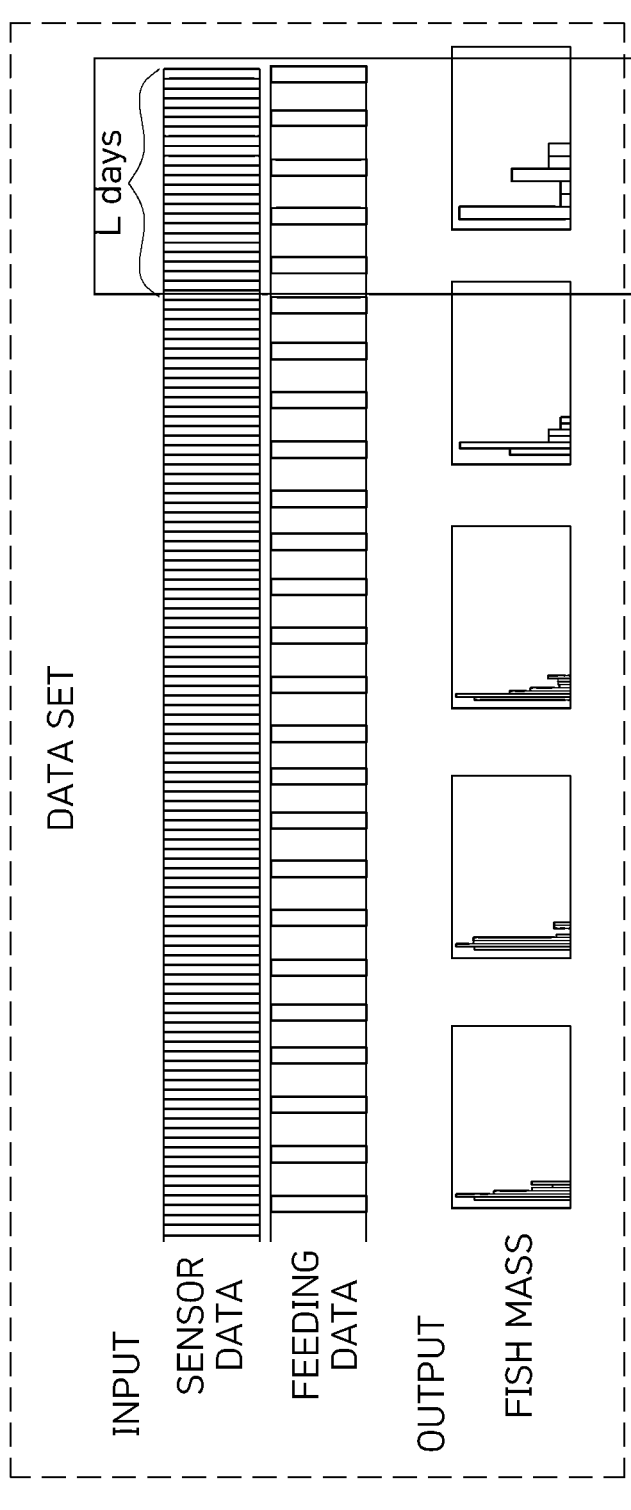
FIG. 10 illustrates a cycle form for each data characteristic.

FIG. 10 illustrates a cycle form for each data characteristic. Sensor data selected as an input value are data having a collection cycle having a first cycle (e.g., a minute unit). Growth and development data are data having a collection cycle having a second cycle (e.g., a day unit). Accordingly, in order to use data as an input value of an artificial intelligence model, cycles need to be synchronized. Accordingly, a data cycle synchronization step is performed. In the data cycle synchronization step of the pre-processing process in step S120, a representative value is designated through a daily average and variance degree operation for the sensor data having the first cycle unit, and the sensor data are aligned as the input data having the second cycle unit.

Figure 11:
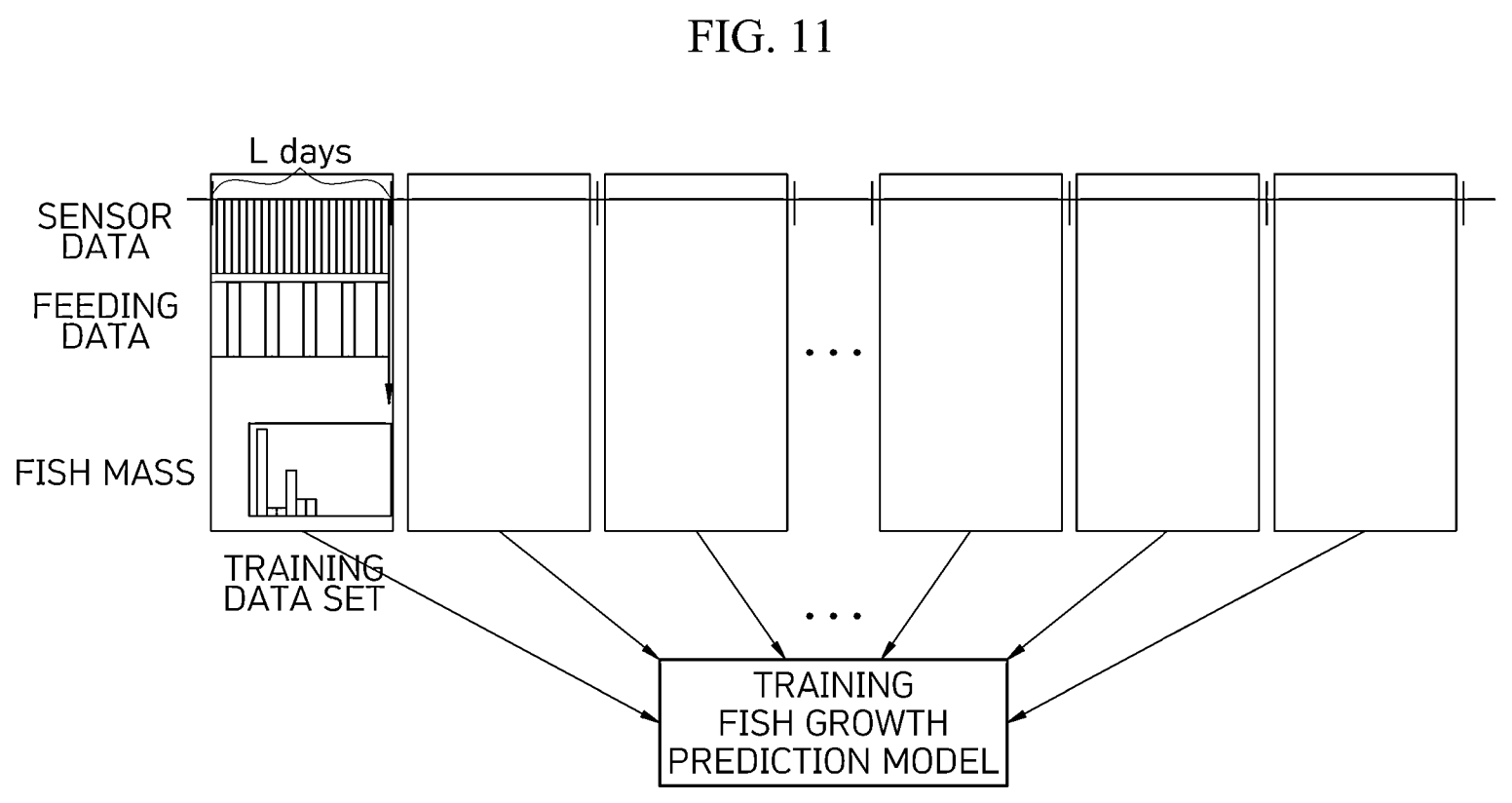

FIG. 11 illustrates the generation of data sets according to an embodiment of the present disclosure. According to an embodiment of the present disclosure, in an aquafarm operation, the cycle of measured weight of fish is selected as an input/output basic data set. In the data set generation step of the pre-processing process in step S120, if a corresponding period is L days illustrated in FIG. 6, a data set in which a day unit sensor data and growth and development data item during the L days is mapped as an input value and a measured weight value is mapped as an output value is set as a basic unit.

In the case of the sensor and growth and development data sets for the L days, when an artificial intelligence model using a corresponding input value is trained, a burden of an operation of the artificial intelligence model is great, a degree of correlation between multiple input values is low, or the accuracy of modeling is low in the case of a variable having great error sensitivity. Accordingly, in the data capacity reduction and conversion step of the pre-processing process in step S120, data reduction conversion having an arbitrary dimension is performed by applying a data reduction scheme to the input data. The data reduction scheme which may be applied includes principal component analysis, uniform manifold approximation and projection (UMAP), and mixed data sampling (MIDAS). According to an embodiment of the present disclosure, M dimension collection data, such as sensor data and growth and development data, are received. The dimension of the data is reduced (through MIDAS, PCA, or UMAP). The reduced data having an N dimension are output.

According to another embodiment of the present disclosure, in the reduction of a dimension, for example, an average value of temperatures, a maximum value and minimum value of the temperatures, a retention time at the maximum value, a retention time at the minimum value, and a daily temperature range (i.e., the range of fluctuation) may be used as input values. It is possible to train the fish growth prediction model by selecting the input values. In this case, the dimension can be extended or reduced by using factors, such as the average value, a deviation, the maximum value, the minimum value, and the retention time.

Still another embodiment of the present disclosure proposes a probabilistic fish growth prediction method in a land-based aquafarm environment.

A conventional growth prediction technology provides only a growth prediction value at specific timing, and has a problem in that it does not have reliability information on a corresponding value.

A conventional growth prediction model is modeling simply using only major variables, such as a water temperature and the amount of feed supplied, and has a problem in that it does not incorporate various environment factors. Accordingly, the possibility of a potential error is incorporated into the results of growth prediction because an error possibility of collection data themselves is not incorporated into the conventional growth prediction model.

Fish species have biological characteristics in which they may have different growth distribution degrees although the fish is raised in the same environment. Accordingly, there is a need for a growth prediction technology into which such characteristics have been incorporated.

The present disclosure has been proposed based on the aforementioned background, and has an object of providing a probabilistic fish growth prediction method capable of supporting a more efficient aquafarm operation and finally increasing an earning rate of an aquafarm, by proposing a probabilistic modeling-based prediction method of predicting a degree of future fish growth based on input data that are collected from an aquafarm environment, but providing the reliability of an average at specific timing and a corresponding predicted value through probabilistic modeling by applying the fish growth prediction model that is necessary for an aquafarm operation.

A probabilistic fish growth prediction method in a land-based aquafarm environment according to still another embodiment of the present disclosure includes (a) a step of collecting data sets in an aquafarm, (b) a step of calculating a hyperparameter for prior information corresponding to an average and variance value of the fish growth prediction model, and (c) a step of calculating a posterior conditional probability distribution of prediction values of an arbitrary input by using the data sets and outputting an average and variance value of predicted output values.

In the step (a), environment data and growth and development data that are collected for a preset growth period are defined as input vectors. A weight gain value, that is, a weight value of fish that has grown during the preset growth period, is defined as an output value.

In the step (b), the hyperparameter of prior information for a Gaussian process (GP) or an overlapping mixture of Gaussian process (OMGP) is calculated.

In the step (b), the hyperparameter is calculated through maximum likelihood estimation (MLE).

In the step (c), the predicted output values are calculated by using the GP according to Equation 3.

$$\Sigma = k(x_*, x_*) - k^T[K + \sigma_n^2 I]^{-1} k \qquad (3)$$

$$\bar{\mu} = k^T[K + \sigma_n^2 I]^{-1} y_{1:m}$$

$$k = [k(x_1, x_*) \dots k(x_m, x_*)]^T$$

$K$ and $\sigma_n^2$ are prior information that needs to be estimated. $x_1$ and $y_{1:m}$ are measured data. $x^*$ is an input value (i.e., a target prediction input).

In the step (c), the probability distribution, average, and variance value of the predicted output values are calculated by using the OMGP according to Equation 4.

$$P(y_* \mid x_*, X, Y) = \sum_{j=1}^{K} \Phi_{*j} N\left(y_* \mid \mu_*^j \sigma_*^{j2}\right) \qquad (4)$$

$$\mu_*^j = k_j(x_*, X)(k_j(X, X) + D_j^{-1})^{-1} y$$

$$\sigma_*^j = \sigma^2 + k_j(x_*, x_*) - k_j(x_*, X)(k_j(X, X) + D_j^{-1})^{-1} k_j(X, x_*)$$

X and y are measured input and output values. x* and y* are input and output values to be predicted. $\mu_*^j$ and $\sigma_*^j$ are an average and variance value of y* to be calculated based on the measured values X and y and the input value x* for prediction.

An embodiment of the present disclosure has an effect in that the embodiment of the present disclosure can be used as shipment timing and management information for an aquafarm operation through the prediction of a degree of the growth of fish at specific timing.

An embodiment of the present disclosure has an effect in that a division task in an aquafarm operation and a maximum/minimum value can be predicted by providing reliability information for a predicted value.

As described above, the probabilistic fish growth prediction method in a land-based aquafarm environment according to an embodiment of the present disclosure may be used in an aquafarm operation and a determination of shipments, and simultaneously provides an average and reliability at corresponding prediction timing unlike a predicted value at specific timing, which is provided in the existing numerical interpretation and artificial intelligence-based modeling based on collection data.

According to an embodiment of the present disclosure, an influence on the growth of fish, which is affected by a specific variable, can be predicted by changing only the specific variable. It is possible to increase the accuracy of prediction of a corresponding variable by accumulating data related to the corresponding variable and continuously updating modeling. Furthermore, it is possible to secure the reliability of the results of the prediction by basically incorporating an error possibility of collection data.

According to an embodiment of the present disclosure, a probabilistic prediction model is applied as the fish growth prediction model. The GP or the OMGP is applied to the fish growth prediction model.

An embodiment of the present disclosure provides information of a predicted average value and a degree of variance at specific timing based on the results of the application of the probabilistic prediction model, unlike in the provision of a predicted value at specific timing, which is provided by a common prediction model.

Figure 12:
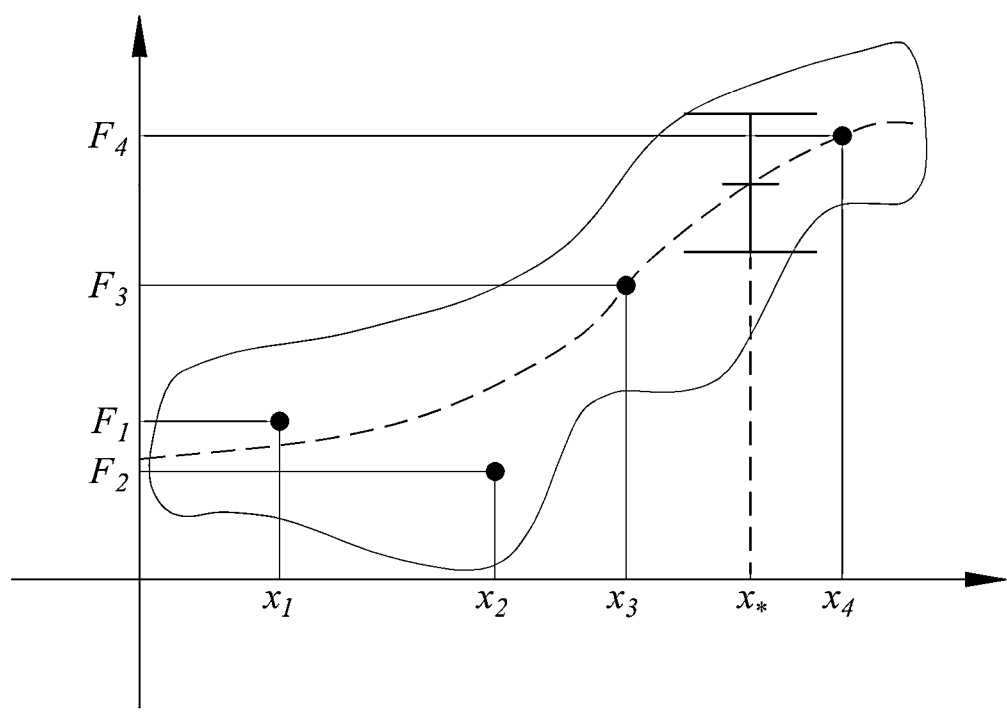
FIG. 12 illustrates an example in which a GP prediction model is applied to a total of four data sets according to another embodiment of the present disclosure and illustrates that an average and a degree of variance are provided at specific timing.

FIG. 12 illustrates an example in which a GP prediction model is applied to a total of four data sets according to another embodiment of the present disclosure, and illustrates that an average and a degree of variance are provided at specific timing.

Figure 13:
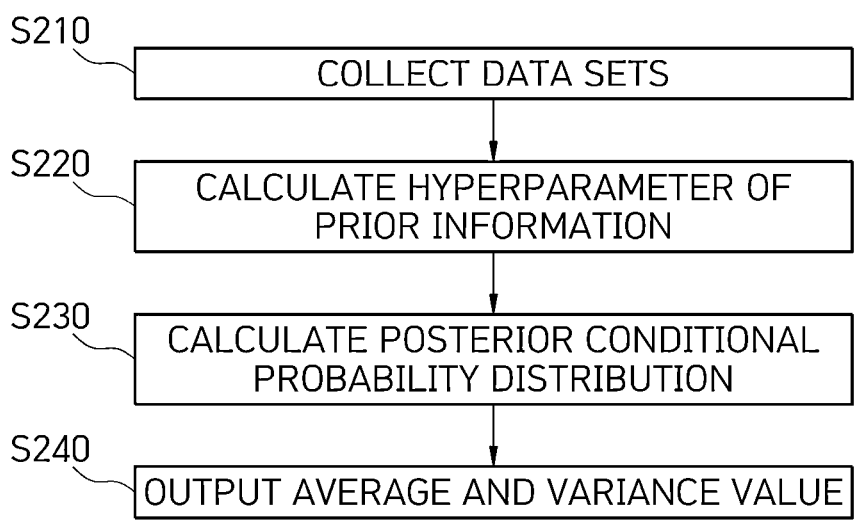
FIG. 13 illustrates a flowchart of an operation of the fish growth prediction model according to another embodiment of the present disclosure.

FIG. 13 illustrates a flowchart of an operation of the fish growth prediction model according to another embodiment of the present disclosure.

GP

According to still another embodiment of the present disclosure, m data sets are generated as in Equation 5 from data that are collected while an aquafarm is operated.

$$D = \{(x_i, y_i), i = 1, \dots, m\} \qquad (5)$$

In the data set, environment data and growth and development data that are collected during a specific L growth period are defined as an input vector $x_i$. A weight value $y_i$ of fish that has grown during the L growth period is defined as an output value, that is, a weight gain value.

For example, when L is 2, a growth period is two weeks, a set of a water temperature, a feed amount, the amount of oxygen supplied, and an initial start weight value during the corresponding period may be set as the input vector $x_i$, and the final weight gain value after the two weeks may be set as an output value.

If the m data sets are given, there is proposed a problem in that a conditional probability density function $p(y_*|y_{1:m})$ that predicts an average and a degree of variance of $y_* = [y_{m+1} \dots y_{m+p}]$ at arbitrary p timing is calculated.

$x_1, x_2, \dots x_m$ assumes a process in which, when a corresponding random variable is defined as $f_i = f(x_i)$, all of possible partial sets $\{f_i | i=1, \dots, n, n \le m\}$ indicate a joint Gaussian distribution and $f_{1:m} = [f_1 f_2 \dots F_m]$ is a Gaussian random vector.

$x_m$ is environment data (e.g., a water temperature and DO) and breeding data (e.g., a feed amount and the number of fishes) at m timing. $y_m$ is growth data (or weight) at the m timing. $f_m = f(x_{,m})$ is a function of the weight $y_m$ of fish that grows when the input data of $X_m$ are given at the m timing.

GP and an observed value of f(x) include noise (e.g., a mean or a variance). A predicted output value is operated as in Equation 6 by incorporating the possibility of an error which may occur in a process of collecting actual data based on the noise.

$$y = f(x) + \epsilon$$

$$\epsilon \sim \mathcal{N}(0, \sigma_n^2),$$

$$f(x) \sim \mathcal{GP}(\mu(x), k(x, x')) \tag{6}$$

$\mu(x)$ and a covariance $k(x,x')$ are an average of input sets corresponding to x and a correlation matrix between x and x', and are statistics which may define a function assuming that the function f(x) is a Gaussian process. $\epsilon$ is noise assuming that a measurement error of a fish weight value may occur.

Referring to FIG. 13, step S210 is a step of collecting data sets. In this step, the m data sets are collected through observation.

Step S220 is a step of calculating a hyperparameter of prior information of the GP. An average and variance value of the prediction model are $\mu(x)$ and the covariance $k(x,x')$, which are prior information.

The covariance (a kernel function) is defined as in Equation 7.

$$k(x, x') = \sigma_f^2 \exp\left(-\frac{\|x - x'\|_2^2}{2\lambda^2}\right) x \in \mathbb{R}^u \quad k(x, x') = \tag{7}$$

$$\sigma_f^2 \exp\left(-\frac{1}{2}(x - x')^T A^{-1}(x - x')\right) A = \text{diag}\{\lambda_1^2, \ldots, \lambda_n^2\}$$

Equation 7 is a function that is defined as a radial basis function (RBF), and indicates correlation between two different points within a process.

$\sigma_f^2$, that is, a kernel parameter, is a maximum size of the covariance which may be represented by the kernel. $\lambda^2$ is a value on which a degree of relation between the two points may be adjusted.

If x and x' are almost similar to each other, the kernel becomes close to a sigma value. x and x' have low relation because the kernel becomes close to 0 as x and x' become distant from each other. x and x' have high relation when a lambda value is great although a distance between the two points is the same.

A hyperparameter $\Theta = [\sigma_f^2, \sigma_n^2, \lambda_1^2 \ldots \lambda_n^2]^T$ is calculated through maximum likelihood estimation (MLE) based on the given m data sets. A gradient decent of Equation 8 may be applied to calculate the hyperparameter.

$$\Theta^* = \arg\max_{\Theta} \log p(y_{1:m}|x_{1:m}, \Theta) \tag{8}$$

Step S230 is a step of calculating a posterior conditional probability distribution $p(y_*|x_*) = N(\bar{\mu}, \Sigma)$ of a predicted value $y^*$ for an arbitrary input value $x^*$ by using the measured m data sets. A posterior average and variance value, that is, predicted output values of y*, are calculated according to Equation 9.

$$\Sigma = k(x_*, x_*) - k^T[K + \sigma_n^2 I]^{-1}k$$

$$\bar{\mu} = k^T[K + \sigma_n^2 I]^{-1}y_{1:m}$$

$$k = [k(x_1, x_*) \ldots k(x_m, x_*)]^T \tag{9}$$

K and $\sigma_n^2$ are prior information that needs to be estimated. $x_1$ and $y_{1:m}$ are measured data. x* is an input value (i.e., a target prediction input).

Step S240 is a step of outputting the average and variance value of the predicted output values and selecting an average and variance value of the predicted value y* as $\bar{\mu}$, $\Sigma$ with respect to the input value x*. In order to calculate the average and variance value (reliability) of the predicted value y* with respect to the input value x*, the output values may be obtained by performing an operation on $\bar{\mu}$, $\Sigma$.

OMGP

Still another embodiment of the present disclosure proposes a design plan for the fish growth prediction model through the application of the OMGP.

Figure 14:
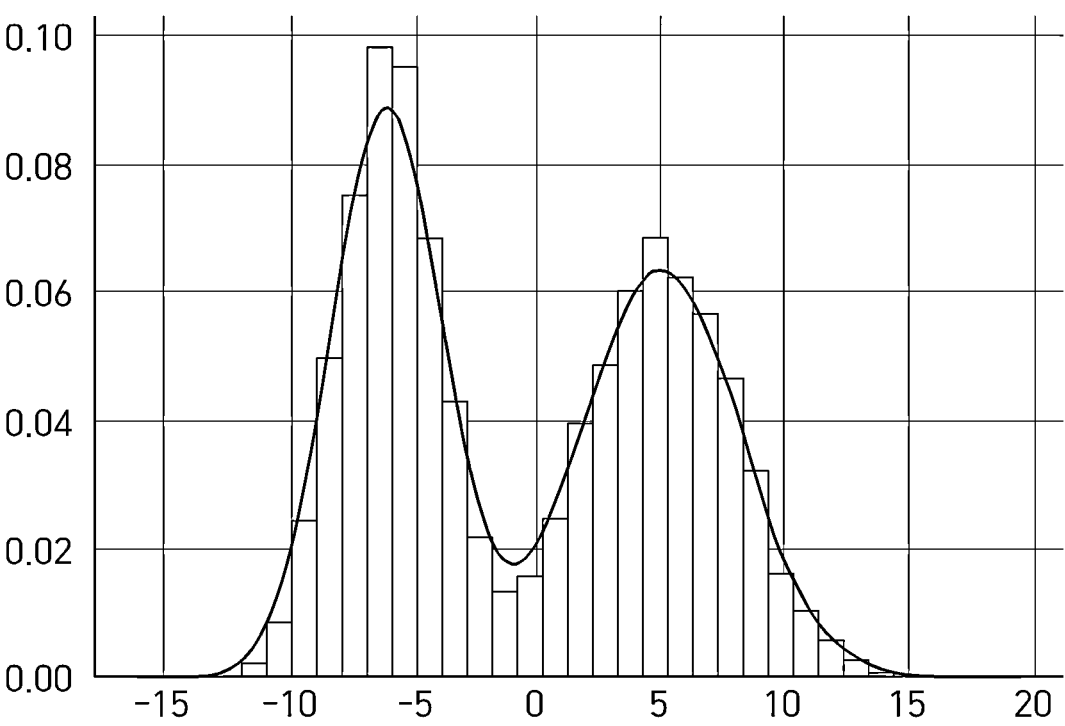
FIG. 14 illustrates an example of multi-modal distribution characteristics.

Referring to FIG. 14, if fish is raised during a specific growth period, the fish has a characteristic in which they have multiple distributions each having a peak form.

Accordingly, there is proposed OMGP modeling of Equation 10 into which the characteristic may be incorporated, which is a form of K GP combinations.

$$y = f(x) + \epsilon, \text{ where } \epsilon \sim N(0, \sigma^2),$$

$$F = \{f_j\}_{j=1}^K \tag{10}$$

$F = \{f_j\}_{j=1}^K$ is a K-latent Gaussian process for KJ multimodal distribution modeling.

The OMGP is a method that substitutes the GP, and is used to calculate a hyperparameter for OMGP Prior based on the collected m data sets, calculate the posterior conditional probability distribution, and sequentially calculate the predicted average and variance value at specific timing.

A probability distribution equation, an average value, and variance value of a predicted value y* OMGP for a new input value x* are represented as in Equation 11.

$$P(y_*|x_*, X, Y) = \Sigma_{j=1}^K \Phi_{*j} N(y_*|\mu_*^j \sigma_*^{j2})$$

$$\mu_*^j = k_j(x_*, X)(k_j(X, X) + D_j^{-1})^{-1}y$$

$$\sigma_*^j = \sigma^2 + k_j(x_*, x_*) - k_j(x_*, X)(k_j(X, X) + D_j^{-1})^{-1}k_j(X, x_*) \tag{11}$$

X and y are measured input and output values. x* and y* are input and output values to be predicted. $\mu_*^j$ and $\sigma_*^j$ are an average and variance value of y* to be calculated based on the measured values X and y and the input value x* for prediction. The OMGP has the same flow as the GP, but is a process of calculating $\mu_*^j$ and $\sigma_*^j$ through an operation.

A parameter corresponding to prior information is operated according to the MLE method as in Equation 12.

$$\Phi_{ij}, \sigma_f^j, , \lambda^j, \sigma = \max_{\Phi_{ij}, \sigma_f^j, \lambda^j, \sigma} P(y|X) \tag{12}$$

$\Phi_{ij}$ is a probability in which data are allocated to a mixture thereof. $\sigma_f^j, \ldots \lambda^j$ is a kernel function parameter. $\sigma$ is a noise variance value.

$\Phi_{*ji}$ is an indication matrix which may belong to a j-th (j=1, . . . , K) GP with respect to the new input value x*. Dj is an N×N diagonal matrix having an i-th diagonal entry of $$\frac{\Phi_{ij}}{\sigma^2}.$$

Utilization Method

According to still another embodiment of the present disclosure, an influence at future timing can be previously evaluated by giving priority to a specific variable within an input variable set and changing the priority. According to an embodiment of the present disclosure, a target shipment timing point can be selected based on an average of predicted values based on probabilistic modeling. An optimal date may be used as a determination value upon division into some groups based on a degree of variance.

What is claimed is:

1. A computer-implemented method of managing productivity of fish in a landbased aquafarm through data prediction for each growth period, the method being performed by an apparatus for managing productivity of fish in a land-based aquafarm, the apparatus comprising a processor and a memory, the method comprising:

classifying, at the processor, a first data set and a second data set,
        the first data set comprising a water temperature and a dissolved oxygen amount collected at a first cycle,
        the second data set comprising a feed amount and a supplied water amount collected at a second cycle, and
        the first cycle being shorter than the second cycle;
    processing, at the processor, the first data set to synchronize the first cycle of the first data set to the second cycle of the second data set and generate representative values of the first data set, the representative values comprising second cycle average values;
    predicting, at the processor, growth of fish by feeding the processed first data set and the second data set into an artificial intelligence model stored on the memory; and
    transmitting, at the processor, based on the predicted fish growth, a control command to adjust the water temperature and the dissolved oxygen amount such that an optimal fish growth condition is satisfied.

2. The method of claim 1, wherein the predicting comprises predicting the input feed amount by using a look-up table for an amount of oxygen consumed and a feed amount supplied.

3. The method of claim 1, wherein the predicting comprises predicting the growth of the fish by operating fish growth prediction models, which are divided in a weight unit, in parallel.

4. The method of claim 1, wherein the predicting comprises predicting timing at which fish is selected based on results of a prediction of a weight value and a weight variance value.

5. An apparatus for managing productivity of fish in a land-based aquafarm, the apparatus comprising:

a memory storing an artificial intelligence model configured to perform prediction of growth of fish; and
    a processor in data communication with the memory and configured to:
        classify a first data set and a second data set,
            the first data set comprising a water temperature and a dissolved oxygen amount collected at a first cycle,
            the second data set comprising a feed amount and a supplied water amount collected at a second cycle, and
            the first cycle being shorter than the second cycle;
        processing the first data set to synchronize the first cycle of the first data set to the second cycle of the second data set and generate representative values of the first data set, the representative values comprising second cycle average values;
        predict the growth of fish by applying the processed first data set and the second data set to the artificial intelligence model; and
        transmit based on the predicted fish growth, a control command to adjust the water temperature and the dissolved oxygen amount such that an optimal fish growth condition is satisfied.

* * * * *